United States Patent [19]

Harshman

[11] 4,348,047

[45] Sep. 7, 1982

[54] WALL CONSTRUCTION FOR A BELLY DUMP TRAILER

[76] Inventor: George A. Harshman, 1253 Neil Creek Rd., Ashland, Oreg. 97520

[21] Appl. No.: 187,480

[22] Filed: Sep. 15, 1980

[51] Int. Cl.³ .............................................. B62D 27/00
[52] U.S. Cl. ................................... 296/184; 105/247; 298/27
[58] Field of Search ................. 296/184, 183; 52/801, 52/806, 807; 29/155 R; 105/247, 250, 406 R, 409; 298/17 R, 24, 27, 29

[56] References Cited

U.S. PATENT DOCUMENTS

| | | | |
|---|---|---|---|
| 3,163,463 | 12/1964 | Femrite | 296/184 |
| 3,363,933 | 1/1968 | Wilson | 296/184 |
| 3,394,514 | 7/1968 | Lindrer | 52/801 X |
| 3,462,187 | 8/1969 | Hassler | 296/184 |
| 3,814,479 | 6/1974 | Vornberger | 296/184 |
| 3,897,972 | 8/1975 | Logue | 296/184 |
| 4,143,501 | 3/1979 | Tuttle | 52/806 X |

*Primary Examiner*—Robert R. Song
*Attorney, Agent, or Firm*—Chernoff & Vilhauer

[57] ABSTRACT

A double wall and method of assembly of the double wall for a cargo hopper, such as that of a belly dump trailer, having a unitary inner member and horizontal reinforcing members formed of the same material as the inner member and welded sequentially to the inner member and previously attached reinforcing members. Channel members extend along top and bottom of the inner member and generally "L"-shaped members are sequentially added to reinforce the intermediate area. An "I"-shaped member is added last to permit continuously welded construction.

12 Claims, 3 Drawing Figures

WALL CONSTRUCTION FOR A BELLY DUMP TRAILER

BACKGROUND OF THE INVENTION

The present invention relates to the construction of a vehicle for carrying dense granular material, and particularly to the construction of a double wall for a belly dump trailer.

Cargo boxes of vehicles such as dump trucks and the like are usually constructed with a load-carrying wall consisting of a single thickness of sheet metal, supported, in some cases, by spaced-apart vertical or sloping I-beams or box beams which are usually fastened on the outer side of the single thickness of sheet metal. An example of such prior cargo box construction is provided in Magor U.S. Pat. No. 2,910,322. Such dump trucks and the like, and particularly belly dump trailers used for hauling dirt, straightrun gravel, and similar dense aggregate materials are subject to stretching and eventual rupture of the sheet metal inner wall.

Particularly weak areas of the construction of belly dump trailer cargo boxes are the interior corners where the vertical side walls join the sloping end walls. The repeated shock and stresses of receiving and carrying heavy loads of dirt, gravel, and rocks result in rupture of the loading-carrying walls of such belly dump trailers particularly frequently in these areas of stress concentration.

In order to improve this situation and provide a belly dump trailer cargo box with greater longevity and strength, a greater thickness of interior wall material has been used, or an additional layer of sheet metal has been added to the outside of the walls of the cargo box. These have provided some additional strength and longevity, but have not been completely satisfactory solutions, partly because of the difficulty in fastening together the components of such a double wall, which presents problems of warpage during welding, and inaccessibility of surfaces which need to be welded to one another.

Other types of double sheet metal wall construction have been disclosed in Johnston U.S. Pat. No. 3,185,112, showing an arrangement for construction of a railroad freight car wall including a generally flat outer sheet metal wall and a ribbed inner sheet metal wall. In the Johnston wall construction the ribs on the inner side of the wall are not interconnected with one another except immediately adjacent the flat outer wall. While this type of construction provides some reinforcement of the wall, it is not particularly adapted for use as a wall of a cargo body such as a belly dump trailer. Since the ribs are not interconnected with one another along their length except immediately adjacent the metal outer wall layer the Johnston wall construction is not as rigid as possible. Additionally, assembly of the Johnston wall, because of the shape of the ribs, is complex.

Radey U.S. Pat. No. 3,123,018 provides a wall construction for freight vehicles which is in some respects similar to that of Johnston, including an outer wall consisting of a single layer of material and an inner face having parallel ribs with space between the edges of the ribs for receiving and gripping nails. The vertical ribs are supported by horizontally disposed angle members which are connected at only a few points to the outer sheet metal wall so that loads carried by the ribs are concentrated at only a few points along the outer wall.

What is needed, therefore, is a type of wall construction and a method for constructing a wall for containing dense material in bulk form, which is stronger and stiffer than previously known walls, without requiring the use of thicker sheet metal material or complex assembly techniques. It is particularly desirable to provide a belly dump trailer wall construction which resists tearing at the corner seams between the vertical side walls and the sloping end walls of the cargo box, and it is desirable for such a wall construction to be easily welded together and to present a long-lastingly pleasant outer appearance.

SUMMARY OF THE INVENTION

The present invention overcomes the disadvantages and shortcomings of the previously-known types of construction for cargo vehicle walls by providing a welded double layer wall construction which has great structural strength and, in particular, is adapted for use in the construction of hoppers such as those of belly dump trailers which resist rupture in the areas where side walls are connected to sloping end walls. Additionally, side wall construction according to the invention adds to the ability of the side walls to support heavy loading of the hopper of such a belly dump trailer or similar bulk cargo box.

The wall construction of the present invention comprises a unitary inner wall member, which may be a flat sheet of metal, to which elongate generally horizontal reinforcing members are connected on the outer side. Along the top and bottom of the inner wall member, generally "U"-shaped channel members are connected with the open top of the "U" facing toward the outer side of the inner wall member. Elongate intermediate reinforcing members of first and second types having a generally "L"-shaped cross section are connected parallel to the channel-shaped reinforcing members, with a face portion, corresponding to the vertical leg of the "L", approximately parallel to the inner wall member. The edge of the face portion of the first type of intermediate reinforcing member is connected to a side of one of the reinforcing channel members, and a rib portion, that is, the other leg of the "L", extends generally perpendicular to the inner wall member and is attached thereto. Additional intermediate reinforcing members of the second type are sequentially connected similarly to one another and to the inner wall member, with the last remaining space being closed by a single elongate closing reinforcing member extending generally parallel to the inner wall member.

Preferably, a narrow interconnecting strip is provided between the face portion and the rib portion of each intermediate reinforcing member, the interconnecting strip being oriented at approximately a 45° angle with respect to the plane of the inner wall member and formed by two bends in the intermediate reinforcing member. Additionally, each intermediate reinforcing member which is connected to another intermediate reinforcing member includes a narrow edge strip which is also oriented at approximately a 45° angle with respect to the inner wall member and is formed by a bend at that edge of the intermediate member. A similar edge strip is provided on the closing reinforcing member where it joins with the next preceding intermediate member. Adjacent interconnecting strips and edge strips form a "V"-shaped groove where intermediate reinforcing members interconnect with one another and with the closing reinforcing member. This form of construction reduces the amount of work hardening of the metal of which the intermediate reinforcing members and the closing reinforcing member are formed and helps resist warping of the reinforcing members during welding to one another and to the inner wall member. The open "V" groove, facing outwardly from the wall, presents a pleasing appearance, and presents a 90° angle within which the weld may be formed, thereby permitting formation of strong 90° weld joints between adjacent intermediate reinforcing members and facilitating the welding process.

It is therefore a primary objective of the present invention to provide a welded form of construction for the walls of cargo vehicles, particularly belly dump trailers, in which the wall construction adds structural rigidity to the vehicle.

It is another important objective of the present invention to provide a wall construction which adds to the longevity of such a cargo box.

It is a further objective of the present invention to provide a wall construction and a method for constructing a cargo vehicle wall in which fabrication is facilitated.

It is yet a further objective of the present invention to provide a cargo vehicle wall which presents a long-lasting pleasing appearance.

It is a principal feature of the present invention that it provides an integral double wall construction incorporating multiple ribs which provide structural strength and rigidity.

It is another important feature of the present invention that it permits all joints between the various members of the wall to be made as 90° "V" welds.

It is yet another feature of the present invention that it provides a wall construction having a smooth inner wall facing toward the cargo, as well as a ribbed outer wall presenting a pleasing appearance.

It is a principal advantage of the present invention that it provides a vehicle cargo box wall construction providing greater strength for supporting loads within a cargo box.

It is another important advantage of the present invention that it provides a wall construction which presents a pleasing outward appearance longer than a cargo box of single wall construction, since any deformation of the inner wall is not visible outwardly.

It is yet another advantage of the present invention that it provides a wall construction having greater resistance to tearing apart along junctions between side walls and end walls of a cargo box than was previously available.

The foregoing and other objectives, features, and advantages of the invention will be more readily understood upon consideration of the following detailed description of the invention taken in conjunction with the accompanying drawings.

DETAILED DESCRIPTION OF THE INVENTION

Figure 1:
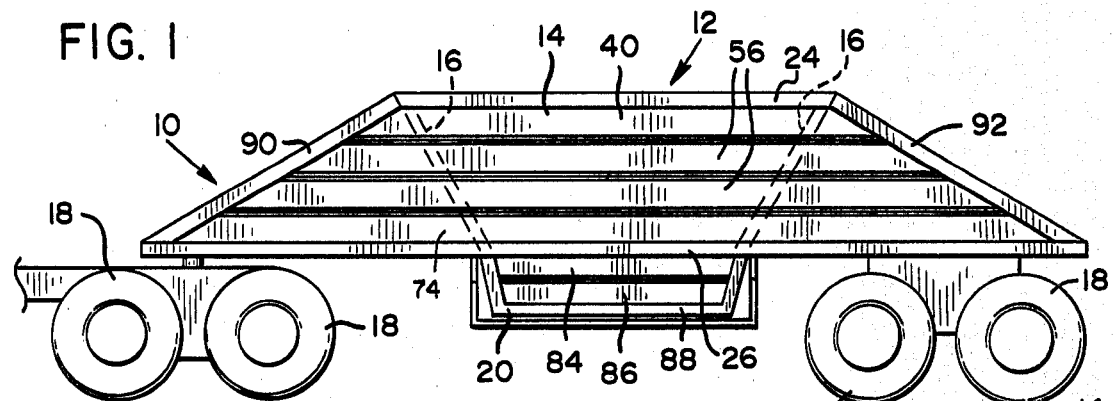
FIG. 1 is a side elevational view of a belly dump hopper trailer having a double wall construction embodying the present invention.

Referring now to the drawings, FIG. 1 shows a belly dump trailer 10 in which a hopper 12, having vertical side walls 14 and sloping end walls 16 of similar construction, is carried on load wheels 18 located at the front and rear of the belly dump trailer. A chute 20 located below the hopper 12 permits the load to be dumped downwardly from the hopper 12.

Figure 2:
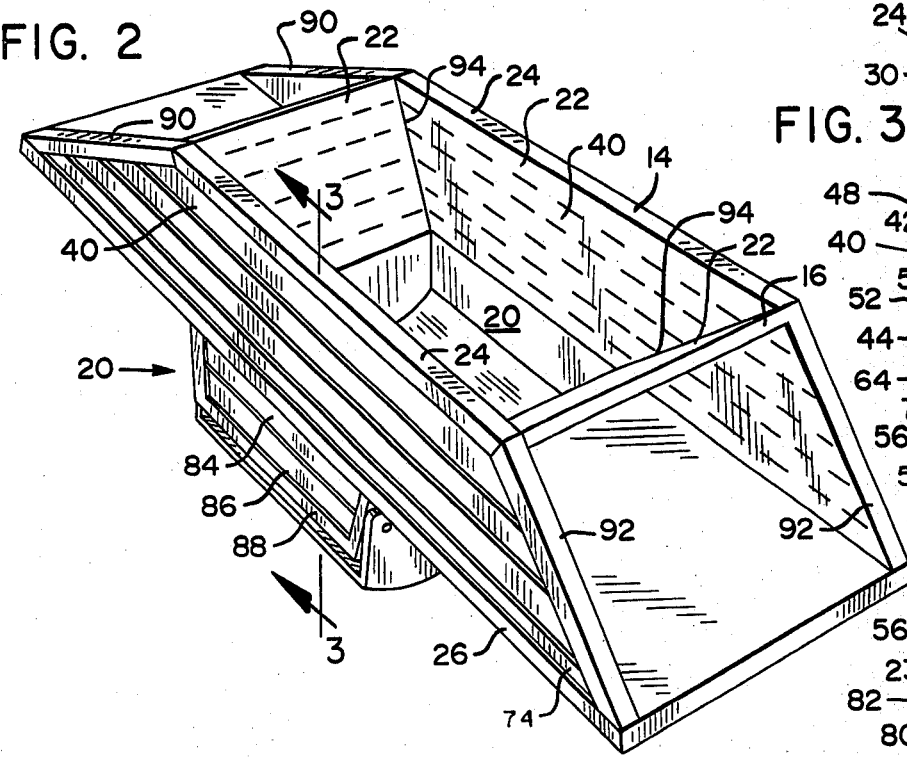
FIG. 2 is a pictorial view of an exemplary hopper for a belly dump trailer which embodies the wall construction of the present invention.

Turning to FIG. 2, as well as FIG. 1, in the belly dump trailer 10, the walls 14 and 16 are of an improved double layer construction according to the invention, in which each wall comprises an inner wall member 22 which is a single layer of metal and may preferably be flat sheet steel of the appropriate thickness, depending upon the weight and type of load for which the vehicle is intended to be used. The inner wall member 22 may be extended further downward in the central portion of the sides 14 and 16 to form the inner surface of the chute 20. Connected to the inner wall member 22 are a first reinforcing channel member 24 which extends horizontally along the top of the inner wall member 22, and a second reinforcing channel member 26 which extends along the bottom margin of the side wall 14, both on the outer side 23 of the inner wall member 22. Each of the reinforcing channel members 24 and 26 comprises a pair of parallel sides 28 (FIG. 3) and an interconnecting side 30 forming together a generally "U"-shaped channel oriented with the open top of the "U" facing toward the outer side 23 of the inner wall member 22. The first and second reinforcing channel members 24 and 26 are preferably formed by bending sheet metal of the same thickness as that used for the inner wall member 22, and are preferably connected to the inner wall member 22 by welding along bead lines 32, 34, 36, and 38, respectively, thus forming tubes along the top and bottom margins of the inner wall member 22.

Figure 3:
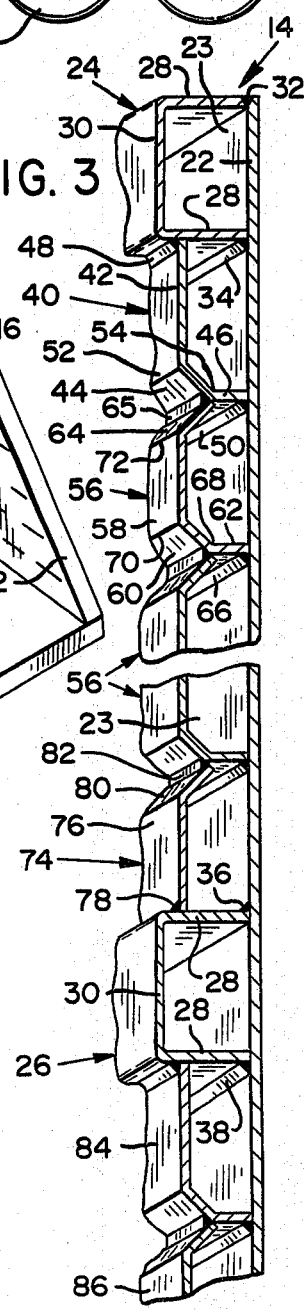
FIG. 3 is a partially cut away pictorial view of a wall of the hopper shown in FIG. 2, taken along line 3—3.

As best shown by FIG. 3, a first intermediate reinforcing member 40 comprises a face portion 42 which extends generally parallel to the inner wall member 22, an interconnecting strip 44, and a rib portion 46 which extends generally perpendicularly from the outer side of the inner wall member 22. An elongate marginal edge of the face portion 42 is connected to one of the parallel sides 28 of the adjacent reinforcing channel member 24, preferably by welding along a bead line 48, while the rib portion 46 is connected to the outer surface 23 of the inner wall member 22, preferably by welding along a bead line 50. The first intermediate reinforcing member is formed preferably by bending sheet metal of a sort similar to that used for the inner wall member 22 along each of a pair of parallel bend lines 52 and 54, preferably bending through an angle of about 45° along each of the bend lines 52 and 54 to make the face 42 perpendicular to the rib portion 46.

A second intermediate reinforcing member 56 comprises a face portion 58, an interconnecting strip 60, and a rib portion 62, similar respectively to the face 42, the interconnecting strip 44, and the rib portion 46 of the first intermediate reinforcing member 40. In addition, the second intermediate reinforcing member 56 comprises an elongate edge strip 64, which extends from the face 58 at an oblique angle, preferably of about 45°, toward the outer face 23 of the inner wall member 22. The edge strip 64 is preferably of the same width as the interconnecting strip 44 and the rib portion 62 is of the same width as the rib portion 46 of the first intermediate reinforcing member. The marginal edge of the edge strip 64 is connected with the first intermediate reinforcing member, preferably by welding along a bead line 65 extending along the bend line 54, and is connected to the outer surface 23 of the inner wall member 22, preferably by welding along a bead line 66.

Additional intermediate reinforcing members 56 would ordinarily be used, each additional reinforcing member 56 being attached similarly to the previously-installed one, the number used depending on the width of the several face portions 58 and the height of the wall 14 or 16 being constructed.

As with the first intermediate reinforcing member 40, the second intermediate reinforcing member 56 is preferably formed by bending along parallel bend lines 68, 70, and 72, which demarcate respectively, the rib portion 62, the interconnecting strip 60, the face portion 58, and the edge strip 64.

A closing reinforcing member 74 extends between the last of the second intermediate reinforcing members 56 and the adjacent side portion 28 of the second reinforcing channel member 26, extending along the bottom edge of the side wall 14. The closing reinforcing member 74 comprises a face portion 76 connected to the side 28 of the second reinforcing channel member, preferably by welding along a bead 78 which extends parallel to the inner wall member 22. An edge strip 80 extends from the face portion 76 at an oblique angle of preferably 45° toward the outer surface 23 of the inner wall member 22 and is joined, preferably by welding along a bead line 82, to the last of the intermediate reinforcing members 56 along the bend line 68 thereof.

All of the interconnecting strips 44 and 60, and the edge strips 64 and 80, are preferably of the same width, and the rib portions 46 and 62 of each of the intermediate reinforcing members 40 and 56 respectively, are of the same size, so that the face portions 42, 58, and 76 of the intermediate reinforcing members 40 and 56, and of the closing reinforcing member 74, respectively, fall within a common plane and are separated by elongate "V"-shaped grooves each including approximately a 90° angle, permitting the welds along the bead lines 54, 68, and 80, to be conveniently accomplished in a secure and strong fashion.

The chute portion 20 of the hopper 12 extends below the lower reinforcing channel member 26 and is preferably of similar construction to the side walls 14, comprising a first intermediate reinforcing member 84 which is similar to the reinforcing member 40, except for its length, and a closing reinforcing member 86, which is similar to the closing reinforcing member 74. A lower reinforcing channel member 88 extends along a bottom edge of the extended inner wall member 22. Additional channel reinforcing members 90 and 92, preferably similar to the channel reinforcing members 24, 26, and 88, extend along the open ends of the enclosed tubes formed by the reinforcing members 24, 26, 40, 56, 74, 84, and 86, providing a finished appearance and additional strengthening of the wall construction.

The walls 14 and 16 according to the invention are assembled by first attaching the channel reinforcing members 24 and 26 in their respective positions, preferably by welding to the outer side 23 of the inner wall member 22.

Additional channel reinforcing members 90 and 92 may then be welded to the outer surface 23 and to the first and second channel reinforcing members 24 and 26, if appropriate for the wall being constructed, as in the case of the side walls 14. Next, the first intermediate reinforcing member 40 is attached, preferably by welding, to the first channel reinforcing member 24 and the outer side 23. Thereafter an appropriate number of intermediate reinforcing members 56 are preferably welded into place, leaving an open gap across which the closing reinforcing member 74 is welded into place.

The sloping ends walls 16 of the hopper 12 are connected to the side walls 14, preferably by welding along corner seams 94. The smooth flat surface of the inner wall members 22 permits a solid weld joint between the inner wall member 22 of each sloping end wall 16 and the inner wall member 22 of the adjoining side walls 14. Assembly of each sloping end wall 16 in its finished location between a pair of side walls 14 permits the entire end of each reinforcing member portion of the sloping end walls 16 to be welded securely to the respective inner wall member 22 of the adjoining side walls 14, resulting in an exceptionally strong welded joint between the side walls 14 and the sloping end walls 16, giving increased strength and resistance to tearing in the areas which are most subject to failure in the previously-known belly dump trailer construction.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A wall for containing a bulk cargo in a vehicle, comprising:
  (a) an inner wall member having inner and outer sides;
  (b) an elongate three-sided first channel reinforcing member fixedly attached to said outer side of said inner wall member, said first channel reinforcing member having a pair of generally parallel sides extending generally perpendicularly from said inner wall member, and an interconnecting side oriented generally parallel with said inner wall member, said first channel reinforcing member and said inner wall member together defining a tube;
  (c) an elongate three-sided second channel reinforcing member fixedly attached to said outer side of said inner wall member and spaced apart from said first channel reinforcing member, said second channel reinforcing member having a pair of generally parallel sides extending generally perpendicularly from said inner wall member and an interconnecting side spaced apart from and oriented, generally parallel with said inner wall member, said second channel reinforcing member and said inner wall member together defining a tube;
  (d) located between said first and second channel reinforcing members, at least one elongate intermediate reinforcing member having a face portion spaced apart from and extending generally parallel with said inner wall member and a rib portion extending generally perpendicularly toward said inner wall member, said face portion having an elongate edge spaced apart from said outer side and fixedly attached to one of said generally parallel sides of one of said first and second channel reinforcing members and said rib portion being fixedly attached to said outer side of said inner wall member; and (e) an elongate closing reinforcing member, said closing reinforcing member having a face portion and a pair of opposite elongate edges, said face portion being spaced apart from and oriented generally parallel with said inner wall member, one of said pair of opposite elongate edges being fixedly attached to one of said at least one intermediate reinforcing members, and the other of said opposite elongate edges being fixedly attached to another one of said channel and said intermediate reinforcing members.

2. The wall of claim 1, said at least one elongate intermediate reinforcing member being of a first type and said wall further including at least one elongate intermediate reinforcing member of a second type having a face portion spaced apart from and extending generally parallel with said inner wall member and a rib portion extending generally perpendicularly toward said inner wall member, an elongate edge of said face portion being fixedly attached to one of said intermediate elongate reinforcing members of one of said first and second types, and said rib portion of said elongate intermediate reinforcing member of said second type being fixedly attached to said outer side of said inner wall member.

3. The wall of claim 2, said elongate intermediate reinforcing members of said first and second types each including interconnecting strip means for interconnecting the respective face portion and rib portion thereof, said interconnecting strip means being oriented at an oblique angle to each respective face portion and rib portion.

4. The wall of claim 3, each said elongate intermediate reinforcing member of said second type and said closing reinforcing member including an edge strip portion extending along an elongate edge of said face portion and oriented at an oblique angle thereto, each said edge strip being fixedly attached to a next adjacent one of said elongate intermediate reinforcing members.

5. The wall construction of claim 4, wherein a respective edge strip and a respective interconnecting strip of adjacent ones of said intermediate and closing reinforcing members define a "V"-shaped groove between the respective face portions of said adjacent ones of said intermediate and closing reinforcing members, said groove opening away from said inner wall member, and said rib portion of a respective intermediate reinforcing member extending from the bottom of said groove toward said outer surface of said inner wall member.

6. The wall construction of claim 4 including a pair of end three-sided channel reinforcing members each having a pair of generally parallel sides extending generally perpendicularly from said inner wall member and an interconnecting side oriented generally parallel with said inner wall member, said end channel reinforcing members being fixedly attached to said inner wall member, said intermediate reinforcing members and said closing reinforcing member.

7. The wall of claim 1 wherein said first and second channel reinforcing members extend generally parallel to one another.

8. The wall construction of claim 1 wherein each of said elongate reinforcing members is a continuous sheet of material.

9. The wall construction of claim 1 in which one of said opposite elongate edges of said closing reinforcing member is attached to one of said generally parallel sides of one of said first and second channel reinforcing members.

10. A belly dump trailer having two side walls and two end walls, the end walls being disposed between the side walls, forming a cargo hopper having sloping interior ends, said side and end walls comprising:

(a) an inner wall member having inner and outer sides;

(b) an elongate three-sided first channel reinforcing member fixedly attached to an outer side of said inner wall member, said first channel reinforcing member having a pair of generally parallel sides extending generally perpendicularly from said inner wall member, and an interconnecting side spaced apart from and oriented generally parallel with said inner wall member, said first channel reinforcing member and said inner wall member together defining a tube;

(c) an elongate three-sided second channel reinforcing member fixedly attached to said outer side of said inner wall member and spaced apart from said first channel reinforcing member, said second channel reinforcing member having a pair of generally parallel sides extending generally perpendicularly from said inner wall member and an interconnecting side spaced apart from and oriented generally parallel with said inner wall member, said second channel reinforcing member and said inner wall member together defining a tube; and (d) located between said first and second channel reinforcing members, an elongate intermediate reinforcing member of a first type having a face portion extending generally parallel with said inner wall member and a rib portion extending generally perpendicularly toward said inner wall member, an elongate edge of said face portion being fixedly attached to one of said generally parallel sides of said first channel reinforcing member, and said rib portion being fixedly attached to said outer side of said inner wall member;

(e) at least one elongate intermediate reinforcing member of a second type having a face portion spaced apart from and extending generally parallel with said inner wall member and a rib portion extending generally perpendicularly toward said inner wall member, an elongate edge of said face portion being fixedly interconnected with one of said elongate intermediate reinforcing members of one of said first and second types, and said rib portion of said at least one elongate intermediate reinforcing member of said second type being fixedly attached to the outer side of said inner wall member; and (f) an elongate closing reinforcing member, said closing reinforcing member having a face portion and a pair of opposite elongate edges, said face portion being spaced apart from and oriented generally parallel with said inner wall member, one of said pair of opposite elongate edges being fixedly attached to one of said intermediate reinforcing members of one of said first and second types, and the other of said opposite elongate edges being fixedly attached to another of said channel and intermediate reinforcing members.

11. The belly dump trailer of claim 10 wherein said first and second channel reinforcing members extend generally parallel to one another.

12. The belly dump trailer of claim 10 wherein one of said pair of opposite elongate edges of said closing reinforcing member is attached to one of said generally parallel sides of said second three-sided channel reinforcing member.

* * * * *